United States Patent
Baek et al.

(10) Patent No.: US 9,757,681 B2
(45) Date of Patent: Sep. 12, 2017

(54) LOW ENERGY-TYPE ACID GAS CAPTURE SYSTEM AND METHOD USING RECIRCULATION OF ABSORBENT

(71) Applicant: KOREA INSTITUTE OF ENERGY RESEARCH, Daejeon (KR)

(72) Inventors: Il Hyun Baek, Daejeon (KR); Jong Kyun You, Daejeon (KR); Ki-Tae Park, Daejeon (KR); JeongnNam Kim, Daejeon (KR); SungYoun Kim, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 15/123,210

(22) PCT Filed: Mar. 7, 2014

(86) PCT No.: PCT/KR2014/001897
§ 371 (c)(1),
(2) Date: Sep. 1, 2016

(87) PCT Pub. No.: WO2015/133666
PCT Pub. Date: Sep. 11, 2015

(65) Prior Publication Data
US 2017/0065928 A1    Mar. 9, 2017

(30) Foreign Application Priority Data
Mar. 6, 2014    (KR) .................. 10-2014-0026651

(51) Int. Cl.
*B01D 53/40*    (2006.01)
*B01D 53/18*    (2006.01)
(Continued)

(52) U.S. Cl.
CPC ...... *B01D 53/1425* (2013.01); *B01D 53/1456* (2013.01); *B01D 53/1475* (2013.01);
(Continued)

(58) Field of Classification Search
CPC ............ B01D 53/1425; B01D 53/1456; B01D 53/1475; B01D 53/18; B01D 53/40; B01D 53/62; B01D 53/78
See application file for complete search history.

(56) References Cited

U.S. PATENT DOCUMENTS 7,424,808 B2 *   9/2008   Mak ................... B01D 53/1456
                                                          423/220
8,845,790 B2 *   9/2014   Leister ............... B01D 53/1425
                                                          95/178
(Continued)

FOREIGN PATENT DOCUMENTS

JP    2005-538841 A    12/2005
JP    2013-519522 A    5/2013
(Continued)

OTHER PUBLICATIONS

International Search Report dated Nov. 24, 2014 of PCT/KR2014/001897 which is the parent application and its English translation—4 pages.
(Continued)

*Primary Examiner* — Colleen Dunn
(74) *Attorney, Agent, or Firm* — Knobbe Martens Olson & Bear LLP

(57) ABSTRACT

The present invention relates to a system and a method therefor capable of reducing the amount of heat which must be supplied to a regeneration tower for regenerating an absorbent in an acid gas capture process for such acid gas as carbon dioxide and provides a low energy-type acid gas capture system and method using recirculation of an absor-
(Continued)

bent capable of reducing energy consumption by recirculating the absorbent, from which acid gas has been pre-separated, to an absorption tower before supplying the absorbent to the regeneration tower in an acid gas capture system.

7 Claims, 2 Drawing Sheets

(51) Int. Cl.
  *B01D 53/14* (2006.01)
  *B01D 53/78* (2006.01)
  *B01D 53/62* (2006.01)

(52) U.S. Cl.
  CPC ............ *B01D 53/18* (2013.01); *B01D 53/40* (2013.01); *B01D 53/62* (2013.01); *B01D 53/78* (2013.01); *B01D 2257/504* (2013.01); *B01D 2258/025* (2013.01); *B01D 2258/0233* (2013.01)

(56) References Cited

U.S. PATENT DOCUMENTS

| | | | |
|---|---|---|---|
| 2006/0110300 A1* | 5/2006 | Mak | B01D 53/1456 62/625 |
| 2012/0118162 A1 | 5/2012 | Ogawa et al. | |
| 2012/0174783 A1* | 7/2012 | Leister | B01D 53/1425 95/187 |
| 2013/0055729 A1* | 3/2013 | Mak | B01D 53/1425 62/56 |

FOREIGN PATENT DOCUMENTS

| | | |
|---|---|---|
| KR | 10-0983677 B1 | 9/2010 |
| KR | 10-2013-0112063 A | 10/2013 |
| KR | 10-2014-0014657 A | 2/2014 |

OTHER PUBLICATIONS

Park, "Carbon Dioxide Capture and Storage Technology", Physics and high technology, Jun. 2009, pp. 19-23.

* cited by examiner

LOW ENERGY-TYPE ACID GAS CAPTURE SYSTEM AND METHOD USING RECIRCULATION OF ABSORBENT

TECHNICAL FIELD

The present invention relates to an acid gas capture process, and more particularly, to a low energy-type acid gas capture system and method using recirculation of an absorbent in liquid form including a large amount of acid gas.

BACKGROUND ART

The concentration increase of acid gas such as carbon dioxide ($CO_2$), methane ($CH_4$), hydrogen sulfide ($H_2S$), carbonyl sulfide (COS) or the like in the air from the use of fossil fuel is causing global warming. In particular, reducing the concentration of carbon dioxide in the air has been actively discussed worldwide in various aspects since the Rio De Janeiro Environmental Conference in 1992.

Carbon dioxide capture and storage (CCS) technologies are isolating carbon dioxide discharged in large quantity from power plants, steel plants or cement plants from the air.

In particular, carbon dioxide capture in CCS technologies is considered a core technology that takes about 70% to about 80% of the overall costs, which may be classified into post-combustion technology, pre-combustion technology, and oxy-fuel combustion technology (refer to "Carbon Dioxide Capture and Storage Technology", by Sang-do Park, Physics and High Technology, June, 2009).

Post-combustion technology is isolating carbon dioxide ($CO_2$) produced from the combustion of fossil fuel by absorbing or reacting the carbon dioxide ($CO_2$) with various solvents. Pre-combustion technology is capturing carbon dioxide ($CO_2$) in exhaust gas before the combustion by pre-treating fossil fuel such as coal, for example, via gasification into carbon dioxide ($CO_2$) and hydrogen ($H_2$), and then isolating the carbon dioxide ($CO_2$) from the mixed gas of carbon dioxide ($CO_2$) and hydrogen ($H_2$) or combusting the mixed gas. Oxy-fuel combustion technology is combusting fossil fuel with only pure oxygen instead of air, thereby to easily capture carbon dioxide ($CO_2$). Post-combustion technology of the above-described technologies is currently most widely used.

Post-combustion technology is the most easy to apply with existing carbon dioxide sources, which isolates carbon dioxide by adsorbing or desorbing carbon dioxide with absorbent, focusing on performance improvement of the absorbent and process improvement therefor. This post-combustion technology includes wet absorption and dry absorption technologies that are currently in commercial use to supply carbon dioxide required for automatic welding or producing urea fertilizer or carbonated drink. Wet absorption technology may have higher efficiency than dry absorption technology.

A typical wet absorption process is a capture process using amine-based absorbent. This process has been used in a modification process involved in petrochemical processes with ensured technical reliability, but still needs further improvement in terms of absorbent performance and process improvement in order to be applicable with flue gas including various contaminants. As a process using amine-based absorbent, a chemical absorption process using an alkanolamine absorbent that includes both amine and hydroxyl groups bound to an alkyl group may be performed using a system equipped with an absorption tower for selectively absorbing carbon dioxide from inflow gas, a regeneration tower (hot regeneration tower) for regenerating the carbon dioxide-absorbed absorbent, and other accessory equipments.

Monoethanolamine (MEA), as a most widely used amine-based absorbent, has alkaline properties due to unshared electrons in amine groups, which may cause acid-base neutralization reaction with acidic carbon dioxide. Furthermore, salts (carbamate or bicarbonate) as reaction products may be decomposed at a temperature of about 110° C. to about 130° C. to be regenerated. The ability to absorb carbon dioxide ($CO_2$) and the absorption rate of an absorbent may vary according to structural characteristics of amines used in the absorbent.

A carbon dioxide absorption process may be performed at about 40° C. to about 50° C., while a regeneration process may be performed at about 110° C. to about 130° C. Accordingly, part of the absorbent may vaporize during the regeneration process and be discharged together with carbon dioxide. In this regard, there is a need for preheating technologies to reduce the heat duty of such as a cooler for cooling and condensing the vaporized absorbent and a reboiler in the regeneration process.

Korean Patent No. 0983677 relates to a system and method of absorbing and separating acid gas, wherein using steam generated in a boiler as a heat source for absorbent regeneration is disclosed. However, using the generated steam only for absorbent regeneration still has limitations.

Therefore, there is a need for the development of technologies to reduce the energy consumption in heating and cooling of the regeneration process.

PRIOR ART DOCUMENTS

Patent Document (0001) Korean Patent No. 0983677

Non-Patent Document (0001) "Carbon Dioxide Capture and Storage Technology", by Sang-do Park, Physics and High Technology, June, 2009

DETAILED DESCRIPTION OF THE INVENTION

Technical Problem

The present invention provides an acid gas capture system and method capable of reducing the energy consumption by using condensation and recirculation of an absorbent discharged from an absorption tower in the acid gas capture system.

Technical Solution

To address the above-described drawbacks, the inventors of the present invention found that a requirement circulation amount of absorbent may be reduced by condensing and recirculating an absorbent discharged from an absorption tower and the energy efficiency of the system may be improved, so that the present invention was completed.

According to an aspect of the present invention, there is provided a low energy-type acid gas capture system using recirculation of an acid gas-absorbed absorbent in liquid form including a large amount of acid gas, the system including: an absorption tower that absorbs the acid gas with an absorbent; a regeneration tower that isolates a processed gas free of the absorbent; an exhaust gas supply line through which an acid gas-included exhaust gas passed through a first heat exchanger and a water separator is supplied to an absorption tower; an absorbent supply line through which the acid gas-absorbed absorbent discharged from the absorption tower is supplied to a separation valve via a second heat exchanger and then a second condenser; a processed gas line through which the processed gas discharged from the regeneration tower is supplied to a first condenser via a third heat exchanger; and a condensate supply line through which condensate water discharged from the first condenser is supplied to a regeneration tower, wherein the absorbent supply line includes: a first absorbent transfer line through which the acid gas-absorbed absorbent in liquid form separated by the separation valve is supplied from the separation valve to the regeneration tower; a second absorbent transfer line through which an acid gas-free absorbent separated from the acid gas-absorbed absorbent in liquid form by the separation valve is supplied from the separation valve to a third condenser via an expansion valve; a third absorbent transfer line through which a recondensed absorbent in liquid form from the third condenser is supplied to the absorption tower via a fourth heat exchanger; a first acid gas transfer line through which the acid gas isolated in the second condenser is supplied to an upper part of the regeneration tower; and a second acid gas transfer line through which the remaining acid gas isolated in the third condenser is supplied to an upper part of the regeneration tower via a condenser.

In some embodiments, an operating temperature of the condenser may be from about 30° C. to about 40° C.

In some embodiments, the acid gas may be carbon dioxide ($CO_2$), methane ($CH_4$), hydrogen sulfide ($H_2S$), carbonyl sulfide (COS), or mercaptane (RSH, wherein R is a hydrocarbon).

In some embodiments, the absorbent supply line and a regenerated absorbent supply line for transferring a regenerated absorbent to the absorption tower via a reboiler connected to a lower part of the regeneration tower may intersect with each other in the second heat exchanger.

According to another aspect of the present invention, there is provided a low energy-type acid gas capture method using recirculation of an absorbent with an absorption tower for absorbing an acid gas with the absorbent, and a regeneration tower for isolating a processed gas free of the absorbent, the method including: supplying an exhaust gas including an acid gas to the absorption tower to absorb the acid gas with the absorbent; heat-exchanging an acid gas-absorbed absorbent discharged from the absorption tower with a regenerated absorbent discharged from a reboiler to obtain a heat-exchanged acid gas-absorbed absorbent; supplying the heat-exchanged acid gas-absorbed absorbent to a condenser to condense the heat-exchanged acid gas-absorbed absorbent to obtain a condensed acid gas-absorbed absorbent in liquid form; supplying the condensed acid gas-absorbed absorbent in liquid form to a separation valve to separate the condensed acid gas-absorbed absorbent into an acid gas-absorbed absorbent and an acid gas-free absorbent; supplying the acid gas-absorbed absorbent separated by the separation valve to the regeneration tower to isolate the acid gas from the acid gas-absorbed absorbent; supplying the acid gas-free absorbent separated by the separation valve to the absorption tower to recirculate the acid-gas free absorbent; and supplying a processed gas discharged from the regeneration tower to a first condenser to isolate a condensate from the processed gas, wherein the recirculating of the acid gas-free absorbent includes: supplying the acid gas-free absorbent in liquid form to a third condenser via an expansion valve to recondense the acid gas-free absorbent in liquid form; supplying the acid gas-free absorbent in liquid form condensed in the third condenser to a fourth heat exchanger to cool a condensed acid gas-free absorbent in liquid form and supplying a cooled acid gas-free absorbent in liquid form back to the absorption tower; and supplying the acid gas isolated in the third condenser to the regeneration tower via a condenser in which the isolated acid gas discharged from the third condenser is condensed before supplied to the regeneration tower.

In some embodiments of the method, an operating temperature of the condenser may be from about 30° C. to about 40° C.

In some embodiments of the method, the acid gas may be carbon dioxide ($CO_2$), methane ($CH_4$), hydrogen sulfide ($H_2S$), carbonyl sulfide (COS), or mercaptane (RSH, wherein R is a hydrocarbon).

Advantageous Effects

As described above, according to the one or more embodiments, an acid gas capture system and method may reduce a required circulation amount of an absorbent by using condensation and recirculation of an absorbent discharged from an absorption tower, so that a total energy requirement of the system may be reduced.

EMBODIMENTS

Figure 1:
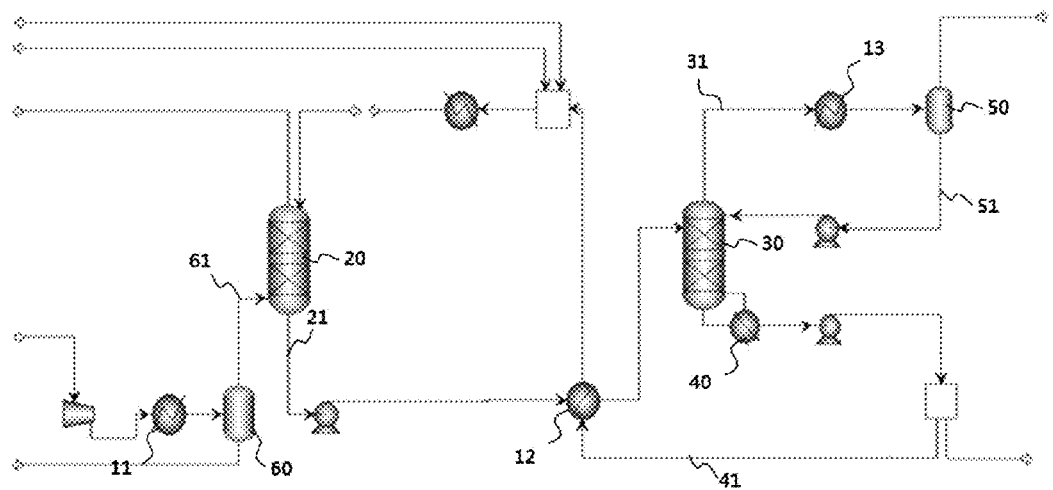
FIG. 1 illustrates a conventional acid gas capture system.

One or more embodiments of an acid gas capture system and method now will be described more fully hereinafter with reference to the accompanying drawings, in which illustrative embodiments of the invention are shown. However, this invention should not be construed as limited to the embodiments set forth herein, and may be embodied in many different forms without departing from the principles and spirit of the invention, the scope of which is defined in the claims and their equivalents.

In the drawings illustrating embodiments of the present invention, like numbers refer to like elements throughout, and detailed description of the same or like elements are not repeated.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Absorbent, processed gas, or condensate transport (supply or discharge) lines that may exchange heat with one another are described herein as "intersecting with each other" at a heat exchanger for heat exchanging. In other words, two of these fluid supply lines may intersect with each other in a heat exchanger for heat exchange with each other.

FIG. 1 illustrates a conventional acid gas capture system. In the conventional acid gas capture system of FIG. 1, an exhaust gas including an acid gas such as carbon dioxide may be supplied to an absorption tower 20 filled with filling matter having a large surface area to facilitate contact between gas and liquid, to contact an absorbent in liquid form that may be sprayed in an upper part of the absorption tower 20 under an atmospheric condition. The contacting between the exhaust gas and the absorbent may be performed at a temperature of about 40° C. to about 50° C., so that the acid gas such as carbon dioxide in the exhaust gas may be absorbed into the absorbent in liquid form.

The absorbent discharged from the absorption tower 20, i.e., the absorbent which has absorbed the acid gas such as carbon dioxide (also referred to herein as "acid gas-absorbed adsorbent"), may be transported to a regeneration tower 30, and then thermally treated at a temperature of about 120° C., so that a processed gas that is free of the absorbent may be obtained. Then, the processed gas free of the absorbent may be discharged through an upper part of the regeneration tower 30, while the regenerated absorbent free of the processed gas may be recirculated by being supplied back to the absorption tower 20 via a reboiler 40. The processed gas discharged from the regeneration tower 30 may be supplied to a condenser 50 via a processed gas discharge line 31. The condenser 50 may condense part of vapor into water so that the vapor remaining uncondensed and acid gas such as carbon dioxide may be obtained as final products. The condensate (condensate water) may be supplied back to the regeneration tower 30 via a condensate supply line 51 for reuse. The recirculating of the condensate may improve the isolation efficiency of the regeneration tower 30 but may also increase the heat duty of the reboiler 40 due to the inflow of the low-temperature condensate. The regenerated absorbent may be transported through a regenerated absorbent supply line 41 to preheat the acid gas-absorbed absorbent that is to be supplied to the regeneration tower 30 via the second heat exchanger 12, and to be supplied back to the absorption tower 20 in order to absorb newly supplied acid gas. The regenerated absorbent supply line 41 may intersect with an absorbent supply line 21 at the second heat exchanger 20, wherein the absorbent supply line 21 may supply the acid gas-absorbed absorbent from the absorption tower 20 to the regeneration tower 30 in the first heat exchanger 10.

Figure 2:
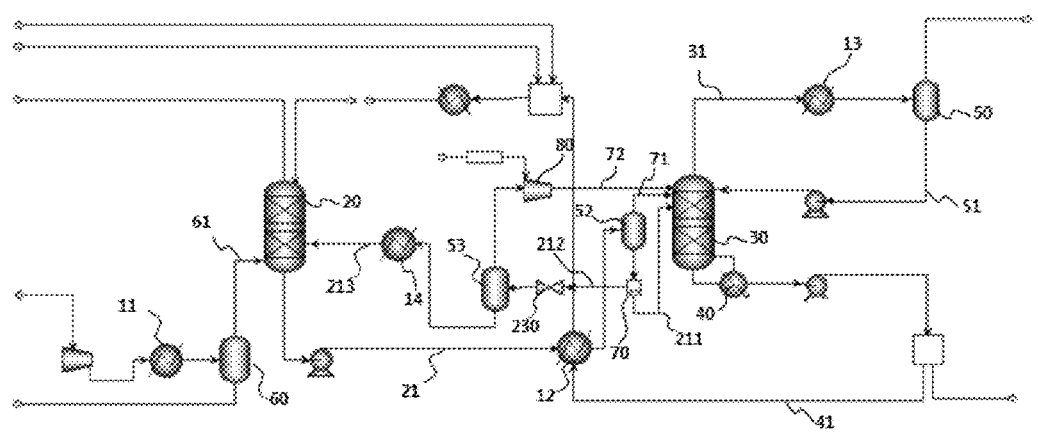
FIG. 2 illustrates an acid gas capture system according to an embodiment of the present invention.

FIG. 2 illustrates an acid gas capture system according to an embodiment of the present invention. The acid gas capture system of FIG. 2 using recirculation of an acid gas-absorbed absorbent including a large amount of acid gas may include an absorption tower 20 for absorbing acid gas with an absorbent and a regeneration tower 30 for isolating a processed gas free of the absorbent. The acid gas capture system of FIG. 2 may include an exhaust gas supply line 61 through which an exhaust gas including an acid gas passed through a first heat exchanger 11 and a water separator 60 may be supplied to an absorption tower 20; an absorbent supply line 21 through which an acid gas-absorbed absorbent discharged from the absorption tower 20 may be supplied to a separation valve 70 via a second heat exchanger 12 and then a second condenser 52; a processed gas line 31 through which the processed gas discharged from the regeneration tower 30 may be supplied to a first condenser 50 via a third heat exchanger 13; and a condensate supply line 51 through which a condensate (condensate water) discharged from the first condenser 50 may be supplied to regeneration tower 30. The absorbent supply line 21 may include: a first absorbent transfer line 211 through which the acid gas-absorbed absorbent in liquid form separated by the separation valve 70 may be supplied from the separation value 70 to the regeneration tower 30; a second absorbent transfer line 212 through which an acid gas-free absorbent separated from the acid gas-absorbed absorbent in liquid form by the separation valve 70 may be supplied from the separation valve 70 to a third condenser 53 via an expansion valve 230; a third absorbent transfer line 213 through which a recondensed absorbent in liquid form from the third condenser 53 may be supplied to the absorption tower 19 via a fourth heat exchanger 14; a first acid gas transfer line 71 through which the acid gas isolated in the second condenser 52 may be supplied to an upper part of the regeneration tower 30; and a second acid gas transfer line 72 through which the remaining acid gas isolated in the third condenser 53 may be supplied to an upper part of the regeneration tower 30 via a condenser 80.

In some embodiments, the absorption tower 20 may include a cooler to lower the temperature to facilitate reaction between a combustion exhaust gas and an absorbent in liquid form supplied into the absorption tower 20. As the absorbent is chemically bound with an acid gas including carbon dioxide in the absorption tower 20, the acid gas may be absorbed by the absorbent. The resulting acid gas-absorbed absorbent may be supplied into the regeneration tower 30 to separate the absorbent from the acid gas for reuse, wherein the absorbent supplied into the regeneration tower 30 may be separated into the free acid gas and absorbent at a high temperature of about 120° C.

In some embodiments, the absorbent supply line 21 may supply the acid gas-absorbed absorbent in liquid form from the absorption tower 20 to the separation valve 70 through the second condenser 52 and then the second heat exchanger 12.

In the second heat exchanger 12, the acid gas-absorbed absorbent in liquid form discharged from the absorption tower 20 may intersect with the regenerated absorbent in liquid form having a high temperature of about 100° C.-120° C. discharged from the reboiler 40, and be heated by the regenerated absorbent in liquid form. The absorbent in liquid form discharged from the second heat exchanger 12 may include the acid gas, acid gas-free absorbent, and acid gas-absorbed absorbent. The absorbent in liquid form may be expanded so that the acid gas is isolated therefrom while passing through the second condenser 52. The isolated acid gas may be supplied into an upper part of the regeneration tower 30 through the first acid gas transfer line 71 and then processed. The absorbent in liquid form discharged from the second condenser 52 may be supplied to the separation valve 70.

The separation valve 70 may separate the absorbent in liquid form based on change in temperature and pressure, into an acid gas-absorbed absorbent in liquid form and an acid-gas free absorbent in liquid form depending on the content of acid gas in the absorbent in liquid form. The acid gas-absorbed absorbent may be supplied from the separation valve 70 to the upper part of the regeneration tower 30 through the first absorbent transfer line 211, and the remaining acid gas-free absorbent may be supplied from the separation valve 70 to the third condenser 53 via the expansion valve 230 through the second absorbent transfer line 212.

The expansion valve 230 may lower the temperature of the absorbent by generating vapor and thus may reduce the cooling consumption of the absorbent in liquid form. The absorbent in liquid form passed through the expansion valve 230 may be supplied to the third condenser 53 in which the acid gas still remaining in the absorbent in liquid form may be separated. The acid gas isolated in the third condenser 53 may be supplied to the regeneration tower 30 via the condenser 80 through the second acid gas transfer line 212.

The isolated acid gas-free absorbent in liquid form in a lower part of the third condenser 53 may be supplied to the absorption tower 20 for reuse via the fourth heat exchanger 14 through the third absorbent supply line 213. In the fourth heat exchanger 14, the absorbent in liquid form may be cooled down before supplied to absorption tower 20 to facilitate reaction with acid gas in the absorption tower 20.

In an acid gas capture system according to any of the above-described embodiments, the isolating and recirculating of absorbent may be achieved at higher efficiency to lower a circulation amount of the absorbent, compared with conventional processes. Due to a reduced amount of the absorbent supplied to the regeneration tower 30, the heat duty of the reboiler may be reduced so that the energy consumption of the acid gas capture system may also be reduced.

In some embodiments, an operating temperature of the condenser 80 may be from about 30° C. to about 40° C. In some embodiments, the acid gas may be selected from carbon dioxide ($CO_2$), methane ($CH_4$), hydrogen sulfide ($H_2S$), carbonyl sulfide (COS), or mercaptane (RSH, wherein R is a hydrocarbon). However, embodiments are not limited thereto.

In some embodiments, the acid gas-absorbed absorbent supply line 21, and a regenerated absorbent supply line 41 for transferring a regenerated absorbent to the absorption tower 20 via the reboiler 40 connected to a lower part of the regeneration tower 30 may intersect with each other in the second heat exchanger 12.

According to another aspect of the present invention, there is provided an acid gas capture method using an absorption tower for absorbing an acid gas with an absorbent, and a regeneration tower for isolating a processed gas free of the absorbent. The acid gas capture method may include: supplying an exhaust gas including an acid gas to the absorption tower in order to absorb the acid gas with the absorbent; heat-exchanging an acid gas-absorbed absorbent discharged from the absorption tower with a regenerated absorbent discharged from a reboiler; supplying the heat-exchanged acid gas-absorbed absorbent to a condenser to condense the heat-exchanged acid gas-absorbed absorbent; supplying the condensed acid gas-absorbed absorbent to a separation valve to separate the acid gas-absorbed absorbent into an acid gas-absorbed absorbent and an acid gas-free absorbent; supplying the acid gas-absorbed absorbent separated by the separation valve to the regeneration tower to isolate the acid gas from the acid gas-absorbed absorbent; supplying the acid gas-free absorbent separated by the separation valve to the absorption tower to recirculate the acid-gas free absorbent; and supplying a processed gas discharged from the regeneration tower to a first condenser to isolate a condensate from the processed gas, wherein the recirculating of the acid gas-free absorbent may include: supplying the acid gas-free absorbent in liquid form to a third condenser via an expansion valve to re-condense the acid gas-free absorbent in liquid form; supplying the acid gas-free absorbent in liquid form condensed in the third condenser to a fourth heat exchanger to cool the condensed acid gas-free absorbent in liquid form and supplying the cooled acid gas-free absorbent in liquid form back to the absorption tower; and supplying the acid gas isolated in the third condenser to the regeneration tower via a condenser in which the isolated acid gas discharged from the third condenser is condensed before supplied to the regeneration tower.

While one or more embodiments have been described above with reference to the figures, it will be understood by those of ordinary skill in the art that various changes in form and details may be made therein without departing from the spirit and scope as defined by the following claims.

Unless otherwise defined, terms used herein have the meaning as commonly understood by one of ordinary skill in the art to which this invention pertains. All references, including publications, patent documents, and non-patent documents cited herein are incorporated herein in their entirety by reference.

LIST OF REFERENCE NUMERALS

11. first heat exchanger
12. second heat exchanger
13. third heat exchanger
14. fourth heat exchanger
20. absorption tower
21. absorbent supply line
30. regeneration tower
31. processed gas discharge line
40. reboiler
41. regenerated absorbent supply line
50. first condenser
51. condensate supply line
52. second condenser
53. third condenser
61. exhaust gas supply line
70. separation valve
71. first acid gas transfer line
72. second acid gas transfer line
80. condenser
211. first absorbent transfer line
212. second absorbent transfer line
213. third absorbent transfer line
230. expansion valve

The invention claimed is:

1. A low energy-type acid gas capture system using recirculation of an acid gas-absorbed absorbent in liquid form including a large amount of acid gas, the system comprising:
    an absorption tower that absorbs the acid gas with an absorbent;
    a regeneration tower that isolates a processed gas free of the absorbent;
    an exhaust gas supply line through which an acid gas-included exhaust gas passed through a first heat exchanger and a water separator is supplied to an absorption tower;
    an absorbent supply line through which the acid gas-absorbed absorbent discharged from the absorption tower is supplied to a separation valve via a second heat exchanger and then a second condenser;
    a processed gas line through which the processed gas discharged from the regeneration tower is supplied to a first condenser via a third heat exchanger; and
    a condensate supply line through which condensate water discharged from the first condenser is supplied to regeneration tower, wherein the absorbent supply line comprises:
a first absorbent transfer line through which the acid gas-absorbed absorbent in liquid form separated by the separation valve is supplied from the separation valve to the regeneration tower;
a second absorbent transfer line through which an acid gas-free absorbent separated from the acid gas-absorbed absorbent in liquid form by the separation valve is supplied from the separation valve to a third condenser via an expansion valve;
a third absorbent transfer line through which a recondensed absorbent in liquid form from the third condenser is supplied to the absorption tower via a fourth heat exchanger;
a first acid gas transfer line through which the acid gas isolated in the second condenser is supplied to an upper part of the regeneration tower; and
a second acid gas transfer line through which the remaining acid gas isolated in the third condenser is supplied to an upper part of the regeneration tower via a condenser.

2. The low energy-type acid gas capture system of claim 1, wherein an operating temperature of the condenser is from about 30° C. to about 40° C.

3. The low energy-type acid gas capture system of claim 1, wherein the acid gas is carbon dioxide ($CO_2$), methane ($CH_4$), hydrogen sulfide ($H_2S$), carbonyl sulfide (COS), or mercaptane (RSH, wherein R is a hydrocarbon).

4. The low energy-type acid gas capture system of claim 1, wherein the absorbent supply line and a regenerated absorbent supply line for transferring a regenerated absorbent to the absorption tower via a reboiler connected to a lower part of the regeneration tower intersect with each other in the second heat exchanger.

5. A low energy-type acid gas capture method using recirculation of an absorbent with an absorption tower for absorbing an acid gas with the absorbent, and a regeneration tower for isolating a processed gas free of the absorbent, the method comprising:
supplying an exhaust gas including an acid gas to the absorption tower to absorb the acid gas with the absorbent;
heat-exchanging an acid gas-absorbed absorbent discharged from the absorption tower with a regenerated absorbent discharged from a reboiler to obtain a heat-exchanged acid gas-absorbed absorbent;
supplying the heat-exchanged acid gas-absorbed absorbent to a condenser to condense the heat-exchanged acid gas-absorbed absorbent to obtain a condensed acid gas-absorbed absorbent in liquid form;
supplying the condensed acid gas-absorbed absorbent in liquid form to a separation valve to separate the condensed acid gas-absorbed absorbent into an acid gas-absorbed absorbent and an acid gas-free absorbent;
supplying the acid gas-absorbed absorbent separated by the separation valve to the regeneration tower to isolate the acid gas from the acid gas-absorbed absorbent;
supplying the acid gas-free absorbent separated by the separation valve to the absorption tower to recirculate the acid-gas free absorbent; and
supplying a processed gas discharged from the regeneration tower to a first condenser to isolate a condensate from the processed gas,
wherein the recirculating of the acid gas-free absorbent comprises:
supplying the acid gas-free absorbent in liquid form to a third condenser via an expansion valve to re-condense the acid gas-free absorbent in liquid form;
supplying the acid gas-free absorbent in liquid form condensed in the third condenser to a fourth heat exchanger to cool a condensed acid gas-free absorbent in liquid form and supplying a cooled acid gas-free absorbent in liquid form back to the absorption tower; and
supplying the acid gas isolated in the third condenser to the regeneration tower via a condenser in which the isolated acid gas discharged from the third condenser is condensed before supplied to the regeneration tower.

6. The low energy-type acid gas capture method of claim 5, wherein an operating temperature of the condenser is from about 30° C. to about 40° C.

7. The low energy-type acid gas capture method of claim 5, wherein the acid gas is carbon dioxide ($CO_2$), methane ($CH_4$), hydrogen sulfide ($H_2S$), carbonyl sulfide (COS), or mercaptane (RSH, wherein R is a hydrocarbon).

* * * * *